United States Patent [19]

Yamagata et al.

[11] Patent Number: 4,979,808
[45] Date of Patent: Dec. 25, 1990

[54] ENDOSCOPE OBJECTIVE LENS SYSTEM
[75] Inventors: Masakazu Yamagata; Ryota Ogawa, both of Tokyo, Japan
[73] Assignee: Asahi Kogaku Kogyo Kabushiki Kaisha, Tokyo, Japan
[21] Appl. No.: 199,071
[22] Filed: May 25, 1988
[30] Foreign Application Priority Data May 26, 1987 [JP] Japan ................................ 62-128861

[51] Int. Cl.⁵ ............................................... G02B 9/00
[52] U.S. Cl. ............................................. 350/450
[58] Field of Search ............................ 350/432, 450

[56] References Cited

U.S. PATENT DOCUMENTS

| 4,403,837 | 9/1983 | Nakahashi | 350/450 X |
| 4,493,537 | 1/1985 | Nakahashi | 350/450 X |
| 4,662,725 | 5/1987 | Nisioka | 350/432 |
| 4,674,844 | 6/1987 | Nishioka et al. | 350/432 X |

FOREIGN PATENT DOCUMENTS

| 3421251 | 12/1984 | Fed. Rep. of Germany . |
| 0224971 | 7/1985 | Fed. Rep. of Germany . |
| 3241167 | 6/1986 | Fed. Rep. of Germany . |
| 61-35414 | 2/1986 | Japan . |
| 117629 | 5/1987 | Japan . |
| 125381 | 5/1987 | Japan . |

Primary Examiner—Scott J. Sugarman
Attorney, Agent, or Firm—Sughrue, Mion, Zinn, Macpeak & Seas

[57] ABSTRACT

An endoscope objective lens system is disclosed in which the lens disposed just in front of a diaphragm stop in the lens system is a divergent lens having a concave surface on the image side and the convergent lens disposed immediately after the diaphragm stop is in the form of a convergent lens unit comprising, in order from the object side, a first optical element and a second optical element. The two optical elements are made of optical materials having different Abbe numbers ($\nu$ values) in such a way that the relation $\nu_2 < \nu_3$ is satisfied, where $\nu_2$ is the Abbe number of the first optical element and $\nu_3$ is the Abbe number of the second optical element.

12 Claims, 15 Drawing Sheets

ENDOSCOPE OBJECTIVE LENS SYSTEM

BACKGROUND OF THE INVENTION

The present invention relates to an endoscope objective lens system that is effectively compensates for lateral chromatic aberration.

Objective lenses for use in endoscopes require that their outside diameter and overall length be made as compact as possible in consideration of the fact that they are assembled in the tip portion of an endoscope together with illumination optics and air/water supplying channels.

The assignee of the present invention previously filed Japanese Patent Application No. 117629/1987 on May 14, 1987 and proposed an invention of a compact endoscope objective lens system of a three-group-four-element composition (this invention is hereunder referred to as prior invention A). A diagrammatic cross section of this lens system is shown in FIG. 26. The same assignee improved the prior invention A and filed Japanese Patent Application No. 125381/1987 on May 22, 1987, in which they proposed an invention of a lens system characterized by a further improvement in lateral chromatic aberration (this invention is hereunder referred to as prior invention B). A diagrammatic cross section of this lens system is shown in FIG. 28.

The lens systems proposed by the two prior inventions A and B employ the necessary minimum number of lens elements (three-group-four-element composition) in order to attain compactness, so they have only a cemented positive lens disposed on the image side to effect achromatism and the result is not necessarily satisfactory in terms of compensation for lateral chromatic aberration.

As shown in FIGS. 26 and 28, the prior inventions A and B depend on providing a deep interface in the cemented positive lens with a view to achieving achromatism. In the prior invention A (FIG. 26), the center of curvature of the interface is on the side of a diaphragm stop, so extra-axial rays of light encounter the interface in a near-perpendicular direction and the difference in refractive index that is caused by the difference in wavelength is not substantial. This is effective for the purpose of compensating for longitudinal chromatic aberration but not so effective in compensation for lateral chromatic aberration. If the curvature of the interface is increased in order to ensure more effective compensation for lateral chromatic aberration, the degree of meniscus of the negative lens element in the cemented lens is increased and the thickness of the peripheral portion of the positive lens element is decreased, making the manufacture (or working) of a small endoscope objective lens either difficult or entirely impossible. If a thicker lens is used in order to ensure a peripheral portion thick enough to be worked, the overall size of the optics is increased and its composition is not at all suitable for use in an endoscope.

In the prior invention B (FIG. 28), the center of curvature of the interface is positioned on the side opposite to the side of a diaphragm stop, so extra-axial rays of light encounter the interface at an angle way off the perpendicular direction. As a result, the difference in refractive index that is caused by the difference in wavelength is increased, which is effective in compensating for not only longitudinal chromatic aberration but also lateral chromatic aberration. However, if an attempt is made to further increase the effectiveness of this lens system, problems can occur as in the case of the prior invention A, such as increased difficulty involved in fabricating positive and negative lens elements or the increase in the overall size of the optics. In addition, the angle of incidence of extra-axial rays will increase with respect to the line normal to the interface, thereby increasing the chance of the occurrence of coma. Furthermore, total reflection becomes highly likely to occur and in order to avoid it, some design compromise must be made by adopting a suitably large radius of curvature of the interface.

In order to achieve achromatism, another cemented lens might be incorporated in the lens system of the prior invention A or B. This would not be the best solution, however, since the most important requirement for an endoscope objective lens system is its compactness.

As described above, attempts to achieve further improvements in compensation for lateral chromatic aberration in the prior inventions A and B have caused problems in association with lens fabrication and the size of optics.

With objective lenses for use in endoscopes, it is desired that lateral chromatic aberration is minimized with reference to the distance between optical fiber cores (or a dimension corresponding to one pixel in an imaging device in an electronic endoscope using the imaging device). If lateral chromatic aberration is compensated insufficiently, the image transmitted will produce noticeable color diffusion, especially in the marginal portion, and the resulting deterioration of image quality will not only cause perception of a defective image but also prevent correct viewing (diagnosis in medical applications).

Endoscopes generally employ optical fibers spaced at a core-to-core distance of about 10 $\mu$m. But with the recent advances in fiber production technology, fibers of smaller diameter have become available and the resolution of fibers per se as image guides is becoming correspondingly higher. A need therefore has arisen to minimize the lateral chromatic aberration of an endoscope objective lens so as to achieve high image quality (i.e., high contrast and high resolution).

SUMMARY OF THE INVENTION

The present invention has been accomplished under the circumstances described above and its principal object is to provide an endoscope objective lens system that achieves effective compensation for lateral chromatic aberration and which features good workability without introducing any substantial change in lens composition, namely, without sacrificing the compactness of the lens system.

Generally, this object of the present invention can be attained by an endoscope objective lens system in which a lens disposed just in front of a diaphragm stop in the lens system is a divergent lens having a concave surface on the image side and a convergent lens disposed immediately after the diaphragm stop is in the form of a convergent lens unit composed, in order from the object side, of first optical element and second optical element. The two optical elements are made of optical materials having different Abbe numbers ($\nu$ values) in such a way that the relation $\nu_2 < \nu_3$ is satisfied, where $\nu_2$ is the Abbe number of the first optical element and $\nu_3$ is the Abbe number of the second optical element.

In one embodiment of the present invention, the first optical element is slightly distant from the second optical element. In other embodiments, the two optical elements are in close contact with each other or bonded together.

In other embodiments, the convergent lens unit is composed of a combination of parallel-plane glass and a planoconvex lens having a convex surface directed toward the image side, or the combination of a planoconcave lens having a small-curvature concave surface on the image side and a positive lens having a large-curvature surface directed toward the image side, or the combination of a planoconcave lens having a small-curvature concave surface on the object side and a planoconvex lens having a convex surface directed toward the image side.

In still other embodiments, at least one cemented positive lens is disposed on the image side of the convergent lens unit and this cemented positive lens is composed of the combination of a positive lens element which is cemented to a negative lens element at a convex interface directed toward the image side, or the combination of a negative lens element which is cemented to a positive lens element at a concave interface directed toward the image side. The cemented positive lens satisfies the relation $\nu_p > \nu_n$ where $\nu_p$ is the Abbe number of the positive lens element and $\nu_n$ is the Abbe number of the negative lens element.

DETAILED DESCRIPTION OF THE INVENTION

In the present invention, the convergent lens positioned immediately after the diaphragm stop is divided into a first optical element which has a certain Abbe number and is made of parallel-plane glass and a second optical element which has a different Abbe number than the first optical element and is formed of a planoconvex lens having a convex surface directed toward the image side. It is the refractive surface of the parallel-plane glass that is responsible for compensating for lateral chromatic aberration.

The range of angles of incidence that can be accepted by objective lenses for use in endoscopes is theoretically wide, so as is also clear from FIG. 25 (for details of this figure, see below), extra-axial rays of light issuing from the divergent lens in front of the diaphragm stop will be incident at a large angle on the convergent lens immediately after the diaphragm stop. However, in the presence of the parallel-plane glass on the incident side, its refractive surface will provide highly effective compensation for lateral chromatic aberration. As a further advantage, in spite of the large angle of incidence of the extra-axial rays issuing from the divergent lens, the parallel-plane glass having no degrees of meniscus is not sensitive to aberrational changes due to eccentricity and shift (lateral offset) and hence is highly protected against errors due to poor workmanship.

Figure 26:
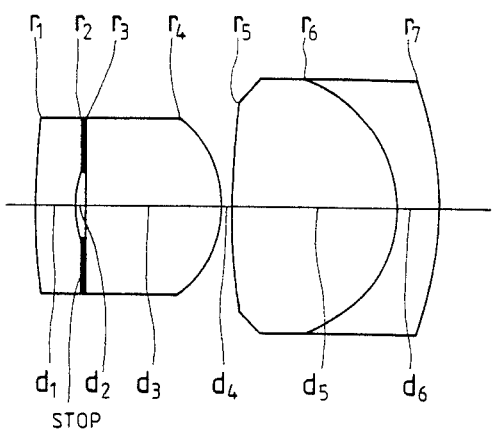
FIG. 26 is a simplified cross-sectional view showing the composition of the lens system of the prior invention A.

Another feature of an endoscope objective lens is that, as is clear from the lens composition shown in FIG. 26 with respect to the prior invention A, a comparatively thick convergent lens is positioned right after the diaphragm stop. This is because in an endoscope objective lens, rays of incident light are desirably launched into the fiber end at a near-perpendicular direction even if they encounter the fiber in its marginal portion. The attenuation of incident light increases as the angle of incidence departs from the normal direction as compared with the numerical aperture of the fiber.

Figure 1:
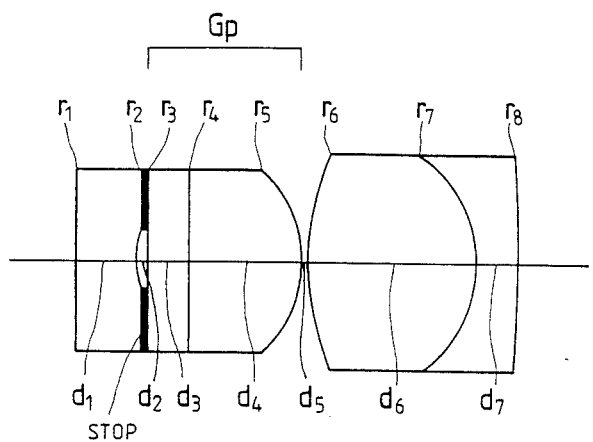
FIGS. 1, 3, 5, 7, 9, 11, 13, 15, 17, 19, 21 and 23 are simplified cross-sectional views showing the compositions of the lens systems constructed in Examples 1, 2, 3, 4, 5, 6, 7, 8, 9, 10, 11 and 12, respectively, of the present invention.
Figure 2:
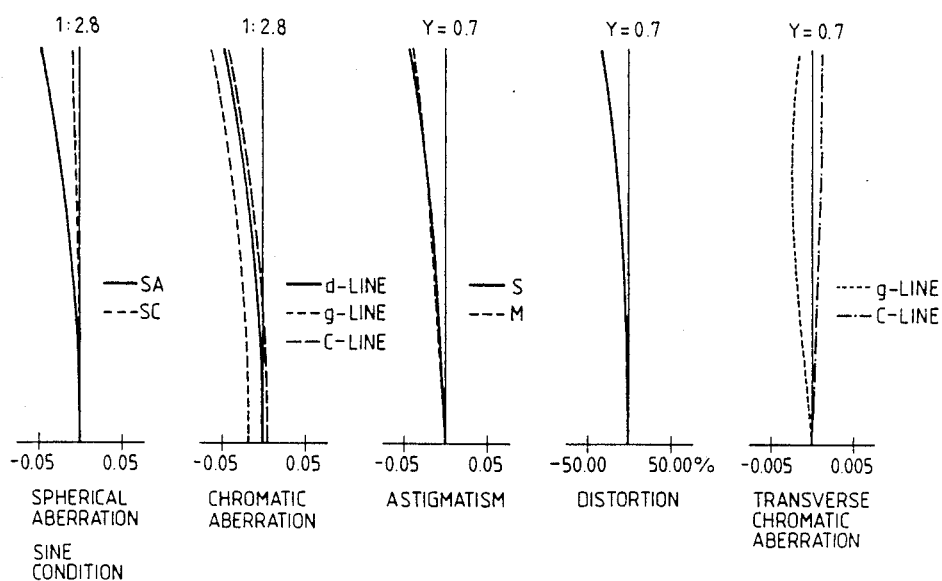
FIGS. 2, 4, 6, 8, 10, 12, 14, 16, 18, 20, 22 and 24 are graphs constructed by plotting the aberration curves obtained with the lens systems of Examples 1, 2, 3, 4, 5, 6, 7, 8, 9, 10, 11 and 12, respectively, of the present invention.
Figure 3:
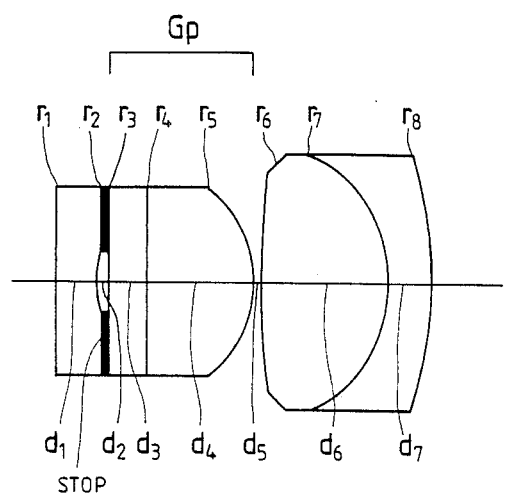
Figure 4:
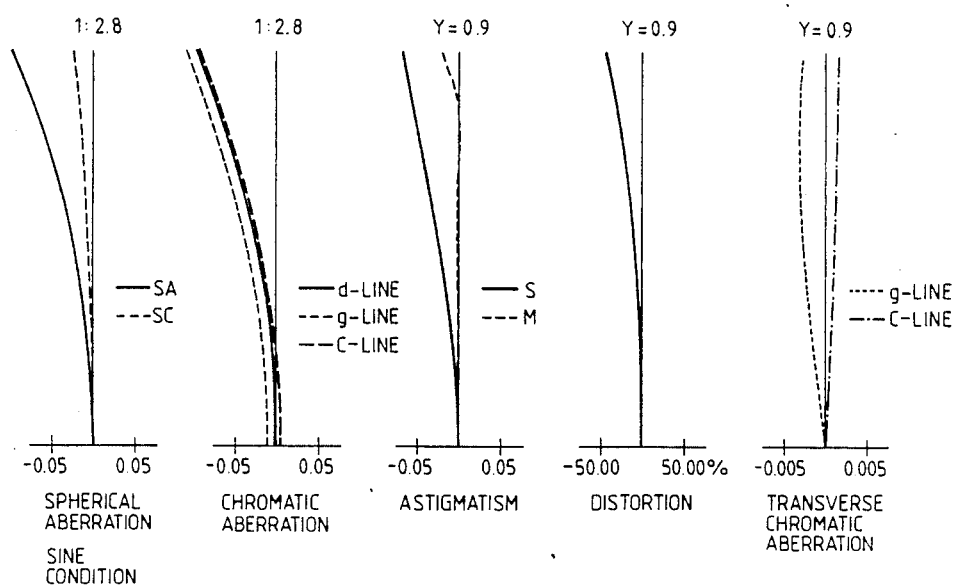
Figure 5:
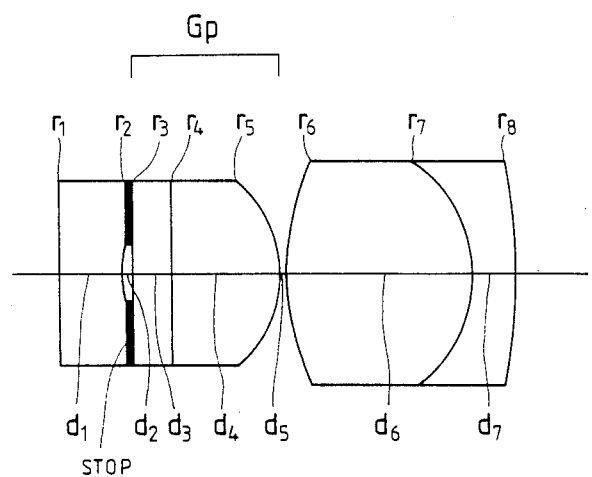
Figure 6:
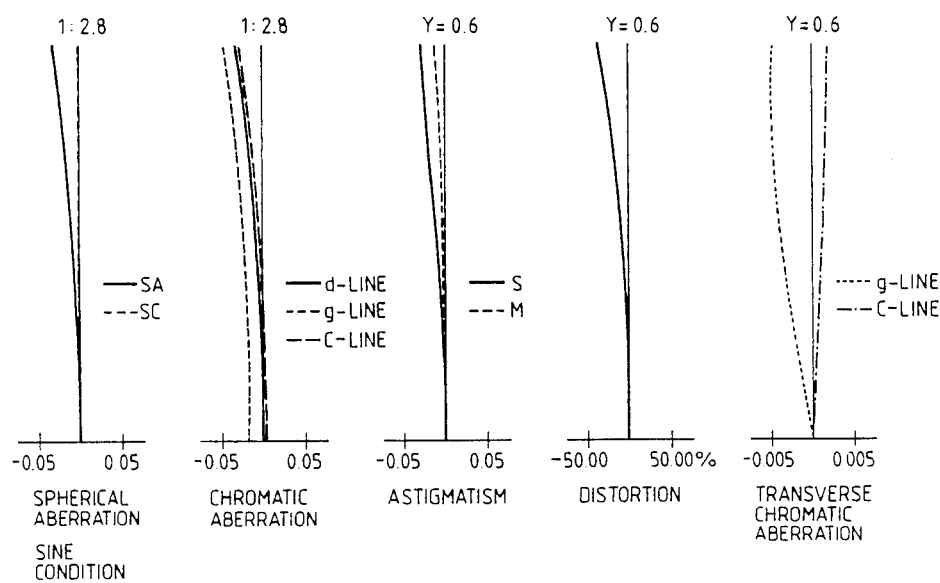
Figure 7:
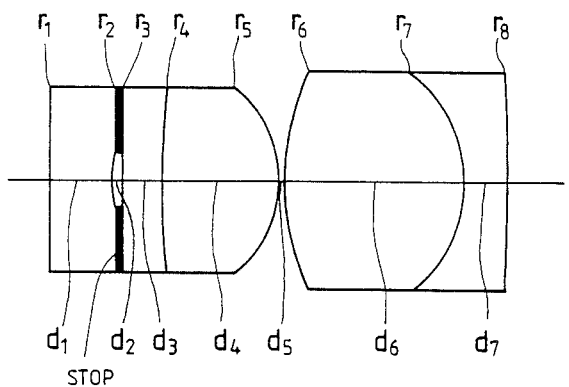
Figure 8:
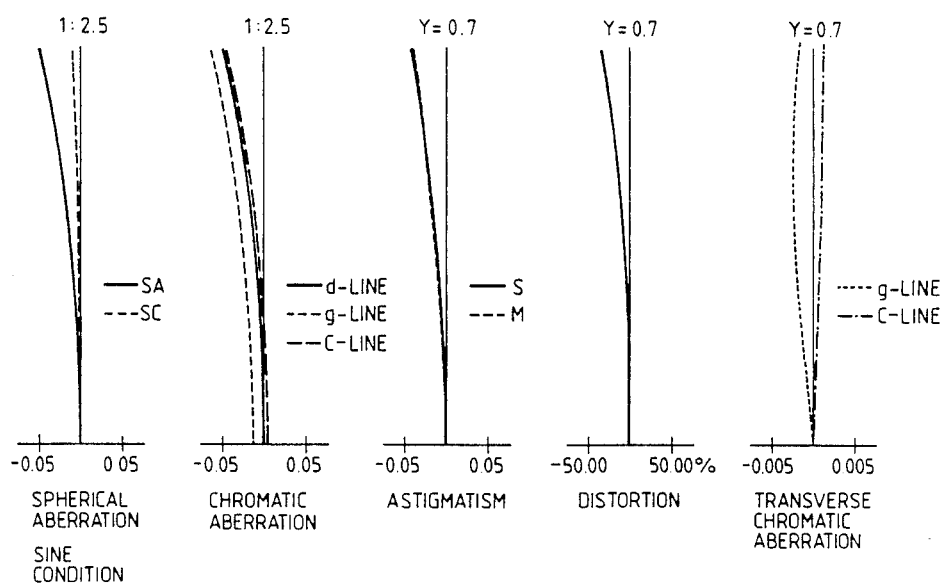
Figure 9:
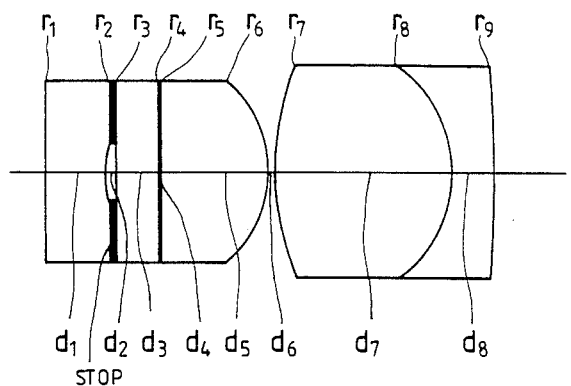
Figure 10:
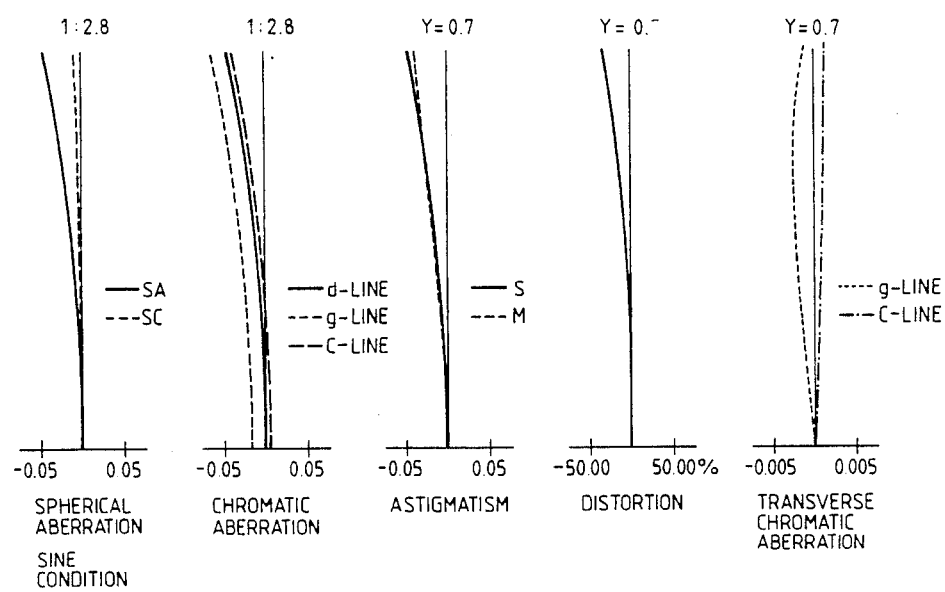
Figure 11:
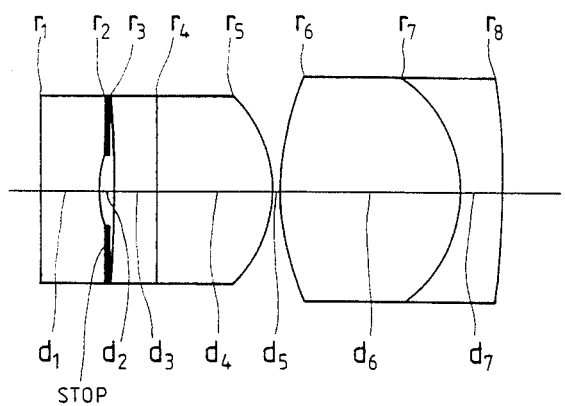
Figure 12:
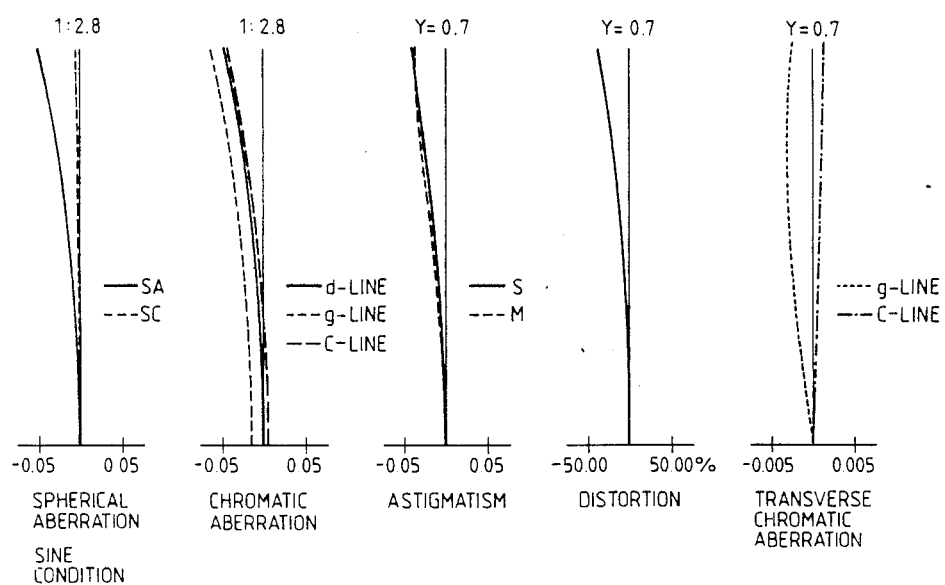
Figure 13:
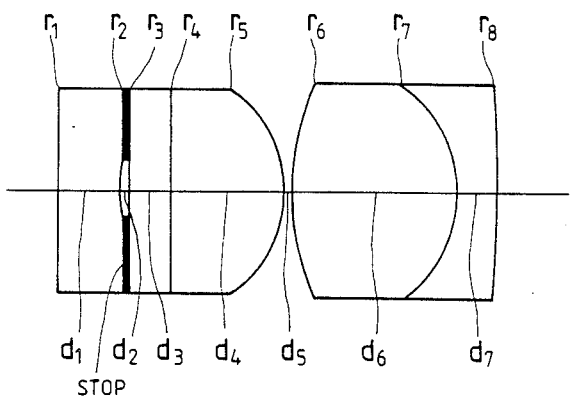
Figure 14:
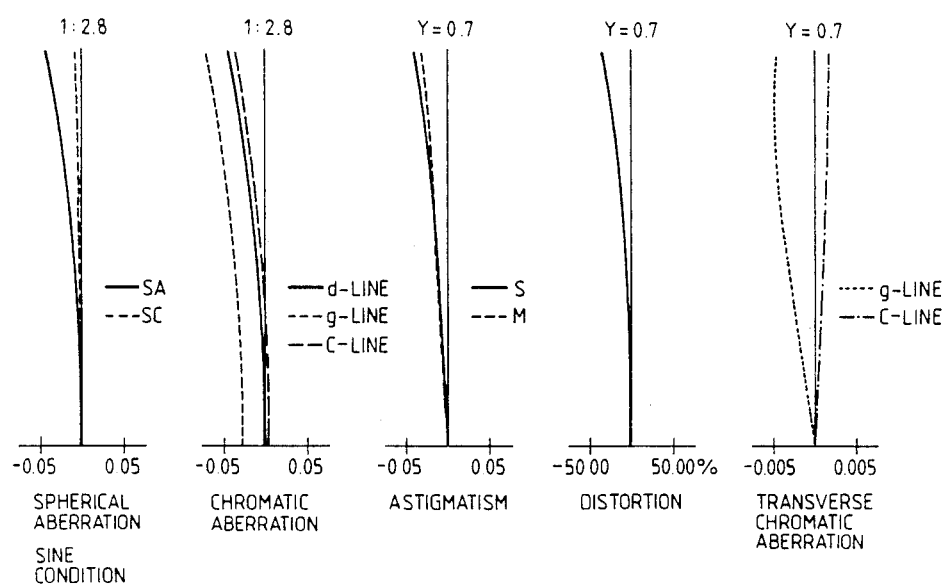
Figure 15:
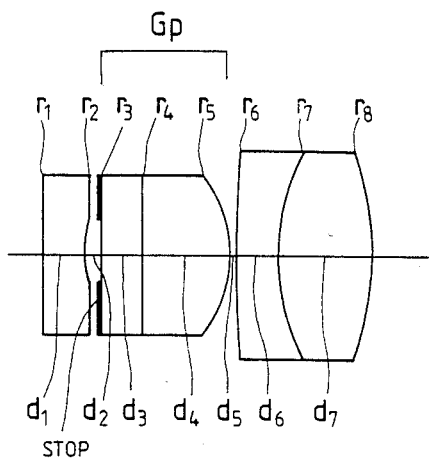
Figure 16:
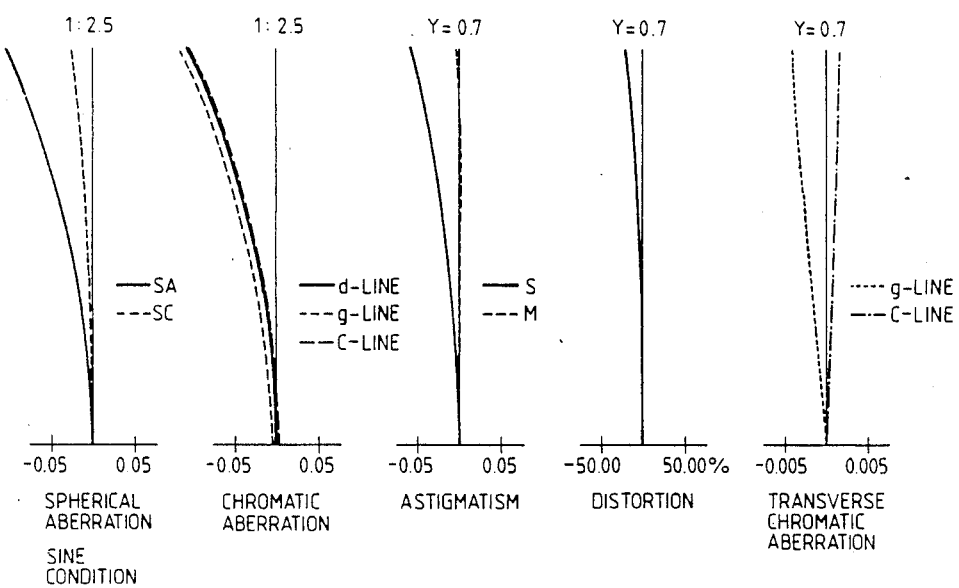
Figure 17:
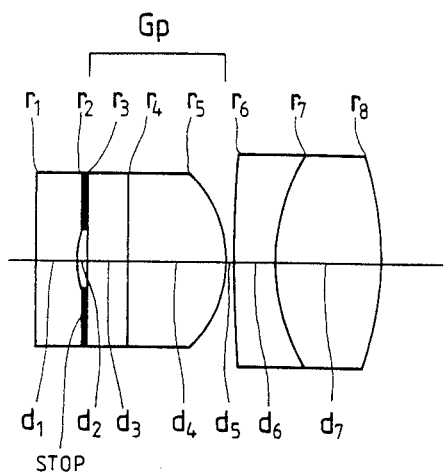
Figure 18:
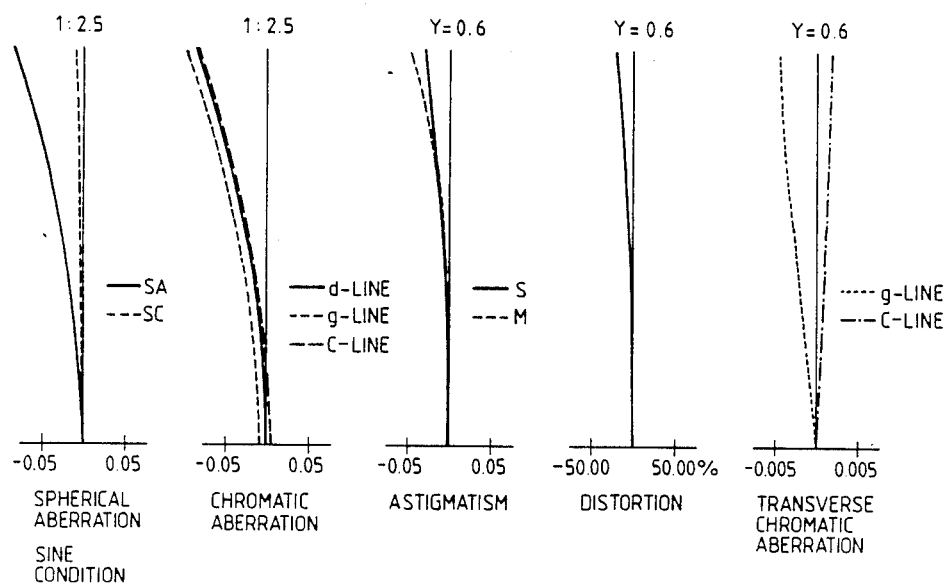
Figure 19:
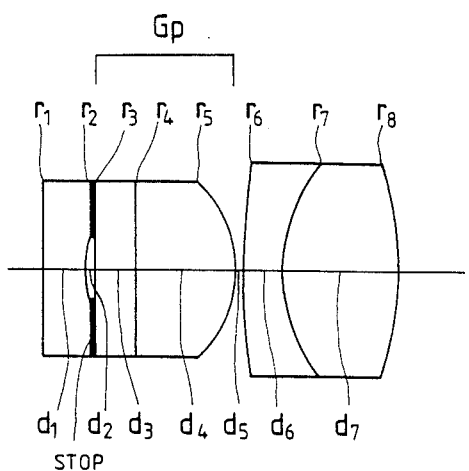
Figure 20:
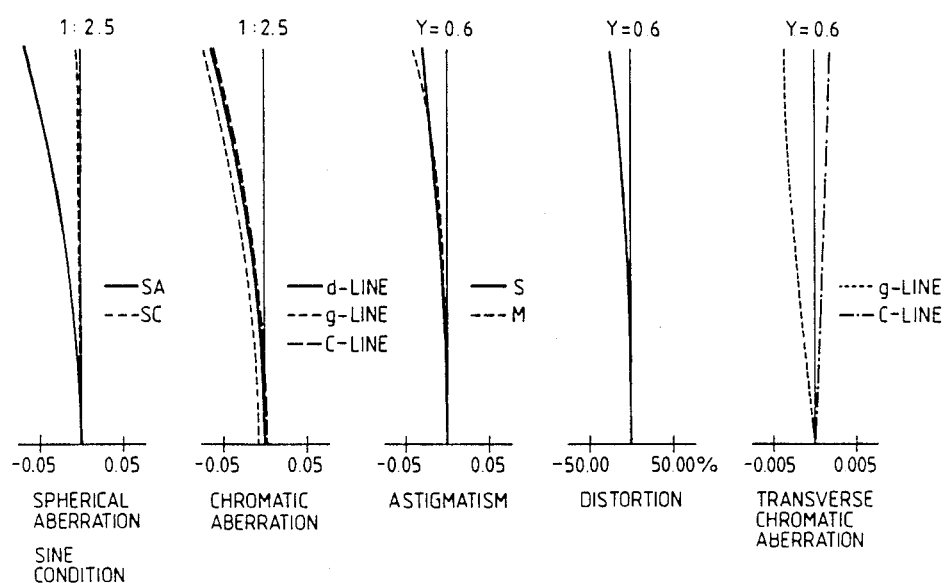
Figure 21:
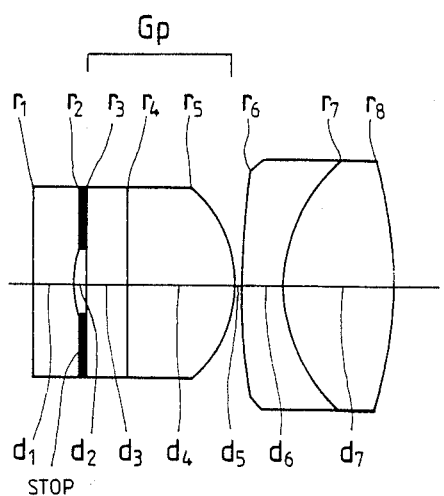
Figure 22:
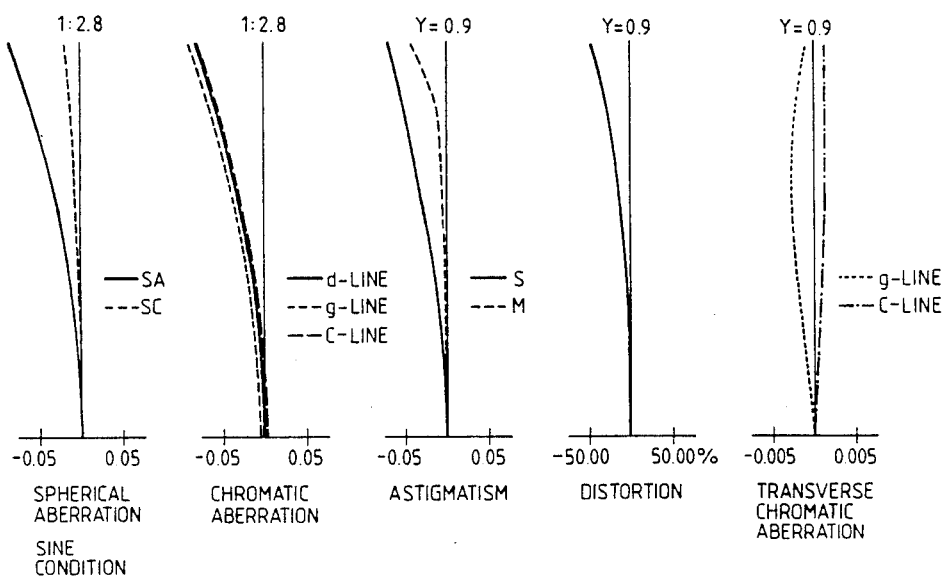
Figure 23:
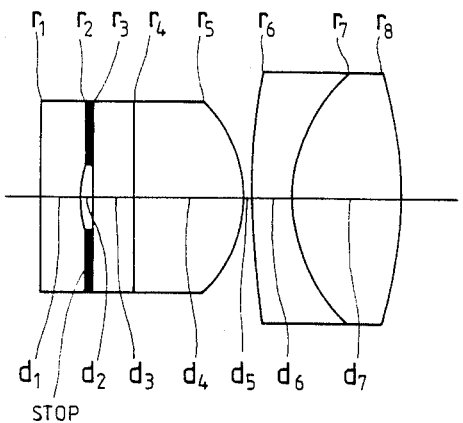
Figure 24:
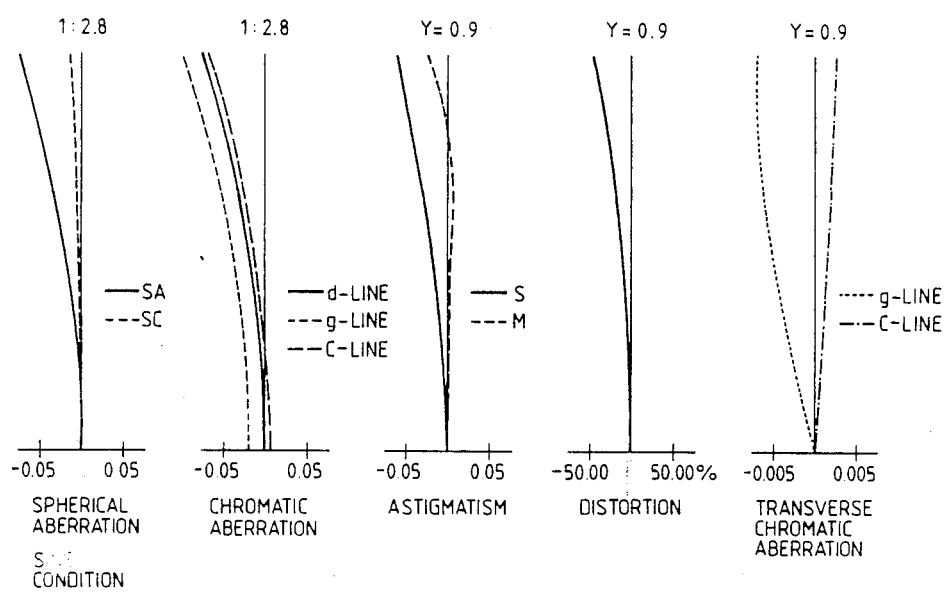
Figure 25A:
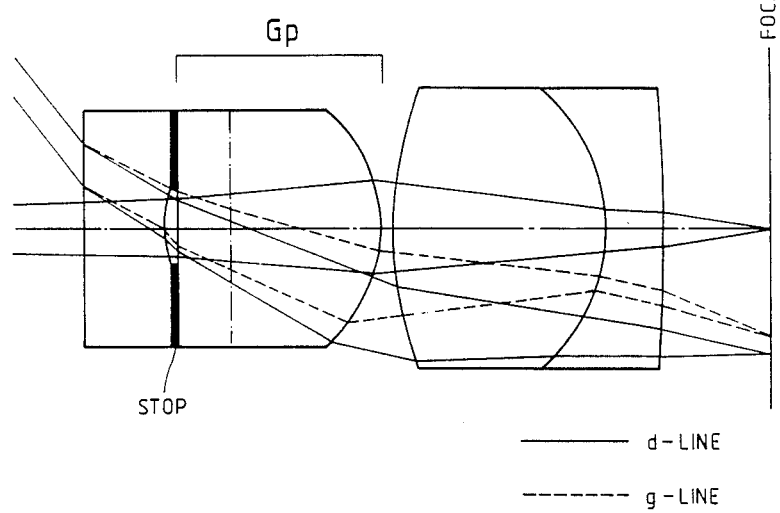
FIG. 25 is a diagram showing the results of ray tracing conducted to illustrate the mechanism of action of the objective lens system of the present invention.
Figure 25B:
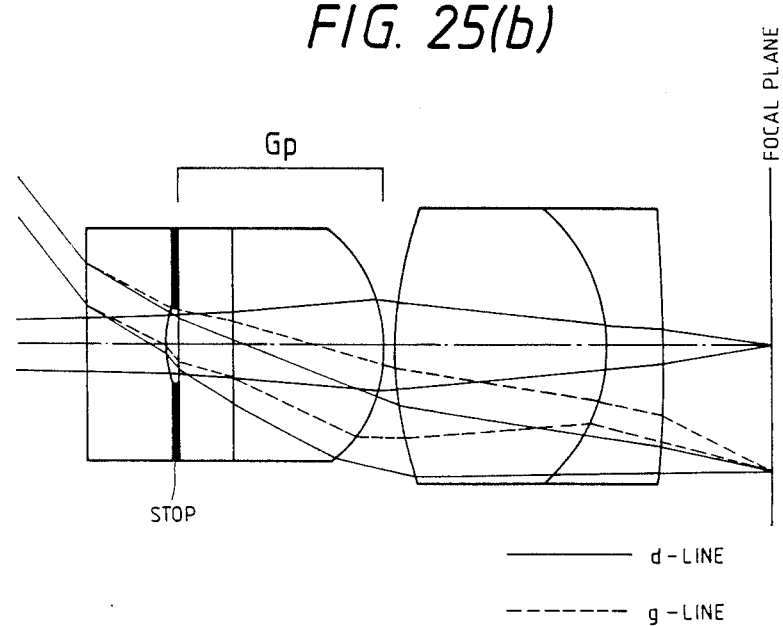

Therefore, the thickness of the convergent lens is closely related to the above-stated object and as is understood from the rays of light that are focused in the marginal portion of FIG. 25(b), this can be attained by assuring that rays of light that issue from said lens and which are incident on the final lens will already have a beam height comparable to the radius of a fiber bundle. In other words, the convergent lens positioned right after the diaphragm stop has the largest possible thickness in order to provide a sufficient height for extra-axial rays of light.

As described above, the convergent lens positioned right after the diaphragm stop is thick enough to be divided into two parts. Since the convergent lens to be divided into two parts according to the present invention has a wall thickness comparable to the lens disposed right after the diaphragm stop in each of the prior inventions A and B, lateral chromatic aberration can be compensated for in an effective way without sacrificing the compactness which is the most important requirement to be met by an endoscope objective lens.

The objective lens system of the present invention has been described above with reference to the case where the convergent lens positioned right after the diaphragm stop is divided into two optical elements, the first of which is parallel-plane glass. Needless to say, the first optical element may be a negative lens with a slight degree of meniscus or the first and second optical elements may be slightly detached from each other and these modifications are equally effective in compensation for lateral chromatic aberration.

Parallel-plane glass has the additional advantage that it does not have to be centered and may be ground and polished to a plane surface. Therefore, large-scale production at low cost is easily accomplished. From the viewpoint of compactness, it is preferred that the first and second optical elements are placed in close contact with each other or that the two elements are bonded together. If the two optical elements are to be placed in close contact with each other, they can be assembled after being dropped into a lens barrel. This approach is more preferred from the viewpoints of fabrication cost and ease of assembly operations.

As described on the foregoing pages, the objective lens system of the present invention is characterized in that the convergent lens unit positioned right after the diaphragm stop is composed of the first and second optical elements and these optical elements satisfy a certain relationship with respect to their Abbe numbers ($\nu$ values).

In order to ensure an appropriate thickness in the peripheral portion, it is desired that the second optical element in the convergent lens unit $G_p$ positioned right after the diaphragm stop has a refractive index of at least 1.7. In addition, in order to prevent a further increase in the chromatic aberration that occurs in the divergent lens positioned closer to the object side than the diaphragm stop, it is desired that the second optical element is made of an optical material of low dispersion. On the other hand, the first optical element is desirably made of a highly dispersive optical material in order to provide for enhanced effectiveness in compensation for lateral chromatic aberration.

Conventionally, a cemented positive lens is positioned on the image side in order to accomplish achromatism in an endoscope objective lens system but this lens alone has been insufficient to achieve complete compensation for lateral chromatic aberration. In the present invention, the convergent lens positioned right after the diaphragm stop is divided into the first and second optical elements having different $\nu$ values and the responsibility for compensating for lateral chromatic aberration is assumed by this convergent lens unit. As a result, the lateral chromatic aberration that develops in the overall system can be suppressed to a reasonably small level.

In practice, the system has to be designed in such a way that the relationship $\nu_2 < \nu_3$ be satisfied, where $\nu_2$ is the Abbe number of the first optical element and $\nu_3$ is the Abbe number of the second optical element. To provide a greater achromatic effect, the difference between $\nu_2$ and $\nu_3$ is desirably not greater than $-15$ ($\nu_2 - \nu_3 \leq -15$). If $\nu_2 > \nu_3$, lateral chromatic aberration will occur in the convergent lens unit of the type employed in the present invention. If $\nu_2 = \nu_3$, the convergent lens unit is in no way different from a single convergent lens element and no benefit will result from dividing the lens unit (it is not effective at all in achieving achromatism). Even if the relationship $\nu_2 - \nu_3 \leq -15$ is not satisfied, there is a certain degree of effectiveness in compensation for lateral chromatic aberration but this is all that can be expected and no more effective compensation can be accomplished.

In a preferred embodiment of the present invention, a cemented positive lens is positioned between the image and the convergent lens unit $G_p$ which is positioned right after the diaphragm stop. This cemented positive lens is composed of a positive lens element cemented to a negative lens element. In order to compensate for chromatic aberration, the two lens elements must satisfy the relation $\nu_p > \nu_n$, where $\nu_p$ is the Abbe number of the positive lens element and $\nu_n$ is the Abbe number of the negative lens element. In order to facilitate the working of the cemented positive lens, namely, to provide an appropriate thickness in the peripheral portion of the positive lens element, each of the positive and negative lens elements is preferably made of an optical material that satisfies the relation $\nu_p - \nu_n > 25$ so that chromatic aberration can be effectively compensated for even if the radius of curvature of the interface of the cemented positive lens is made fairly large to provide a small degree of meniscus for that positive lens element.

The ability of the convergent lens unit positioned right after the diaphragm stop to compensate for lateral chromatic aberration is described hereinafter with reference to FIG. 25 in which said convergent lens unit is composed of parallel-plane glass (i.e., the first optical element) and a planoconvex lens (i.e., the second optical element). FIG. 25 shows the results of ray tracing of d- and g-lines at reference wavelengths, with the amount of deviation of g-line from d-line being shown at an enlarged (exaggerated) scale. FIG. 25(a) shows the results of calculation assuming the absence of dispersion in the parallel-plane glass. In this case, the g-line focusing on the imaging plane is greatly offset toward the optical axis, producing an uncompensated portion of the lateral chromatic aberration. FIG. 25(b) shows the results of normalized calculation on the basis of the same lens data for the case where the Abbe number of the parallel-plane glass is 23.9. As shown, the g-line coincides with the d-line on the imaging plane and the lateral chromatic aberration is satisfactorily compensated.

As is clear from FIG. 25(b), the first optical element (parallel-plane glass) permits rays having a shorter wavelength than a reference for design to be refracted toward an optical axis whereas rays having a longer wavelength are refracted outwardly, thereby reducing the lateral chromatic aberration that is to be finally produced on the imaging plane. The greater the difference in the angle of refraction that occurs in the first optical element with respect to the reference wavelength (i.e., the more dispersive the first optical element is), the more effective it is in achieving achromatism. Therefore, the Abbe number of this first optical element is desirably no more than 30.

Figure 27:
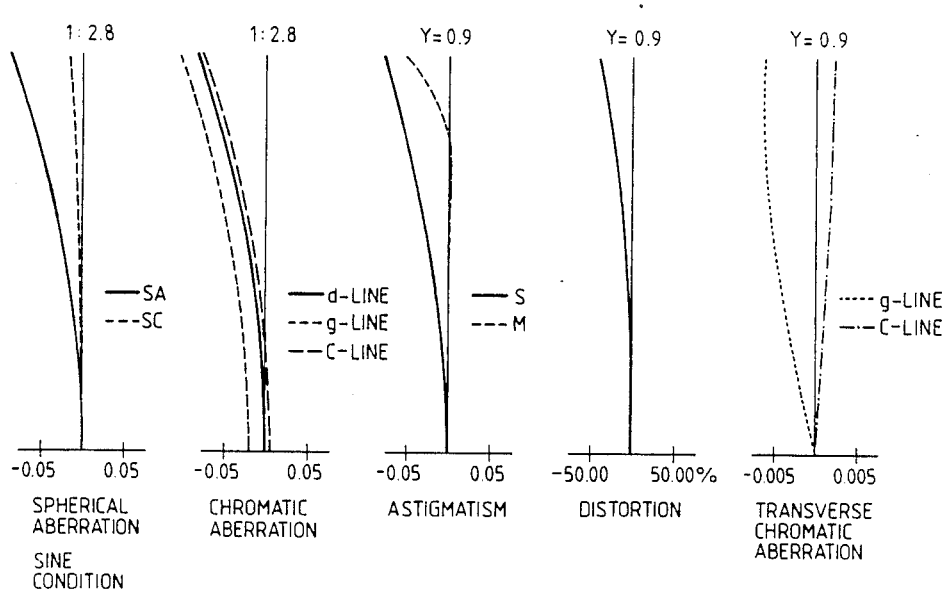
FIG. 27 is a graph constructed by plotting the aberration curves obtained with the lens system of the prior invention A.
Figure 28:
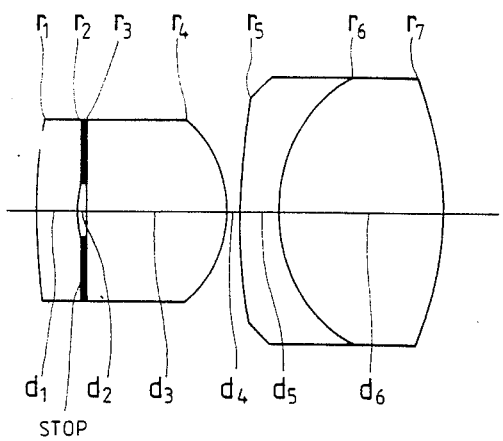
FIG. 28 is simplified cross-sectional view showing the composition of the lens system of the prior invention B.
Figure 29:
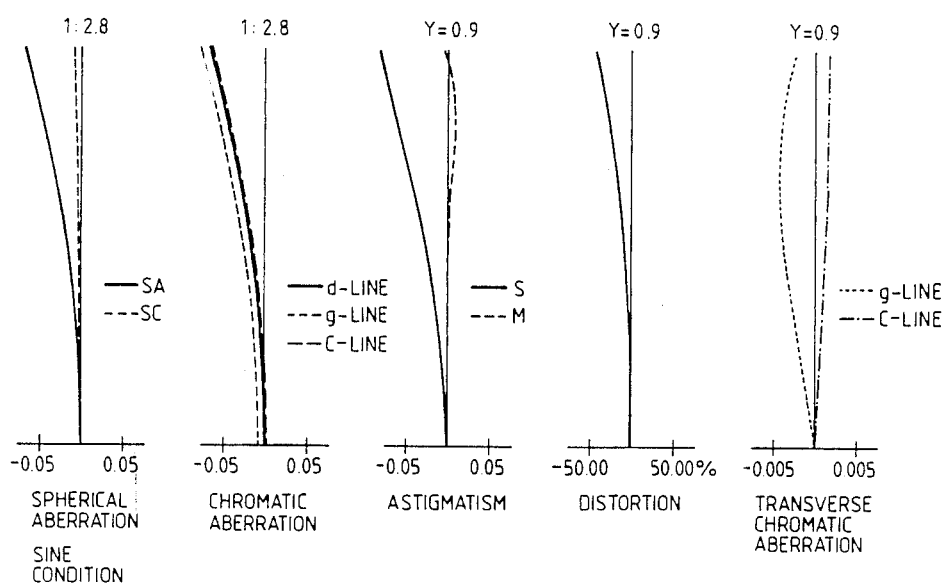
FIG. 29 is a graph constructed by plotting the aberration curves obtained with the lens system of the prior invention B.

Graphs constructed by plotting the aberration curves obtained with the lens systems proposed in the prior inventions A and B are show in FIGS. 27 and 29. By comparing these graphs with those shown in FIG. 2, 4, 6, 8, 10, 12, 14, 16, 18, 20, 22 and 24 for twelve examples of the present invention, one will be able to see that the lens system of the present invention reduces lateral chromatic aberration by about half the amount that occurs in each of the lens systems of the prior inventions A and B. Therefore, if aberration of a magnitude comparable to that developing in the prior inventions is tolerated, the cemented positive lens may have a fairly small curvature at its interface between positive and negative lens elements and hence can be fabricated with great ease.

Twelve specific examples of the present invention are described hereinafter with reference to data sheets, in which $F_{NO}$ signifies an F number. f is the focal length of the overall system, $\omega$ is the half view angle, $f_B$ is the back focus, r is the radius of curvature of an individual lens surface, d is the lens thickness or aerial lens-to-lens distance, N is the refractive index at the d-line of an individual lens, and $\nu$ is the Abbe number of an individual lens.

EXAMPLE 1

| $F_{NO}$ = 1:2.8 | f = 0.869 | Distance to object = 5 | |
| $\omega$ = 50° | $f_B$ = 0.586 | | |
| --- | --- | --- | --- |
| Surface No. | r | d | N | $\nu$ |

-continued

| | | | | |
|---|---|---|---|---|
| 1 | ∞ | 0.45 | 1.51633 | 64.1 |
| 2 | 0.676 | 0.07 | | |
| 3 | ∞ | 0.30 | 1.84666 | 23.9 |
| 4 | ∞ | 0.84 | 1.72916 | 54.7 |
| 5 | −0.824 | 0.05 | | |
| 6 | 1.877 | 1.20 | 1.72916 | 54.7 |
| 7 | −0.950 | 0.30 | 1.84666 | 23.9 |
| 8 | −10.794 | | | |

EXAMPLE 2

$F_{NO} = 1:2.8$  $f = 1.013$  Distance to object = 10
$\omega = 60°$  $f_B = 0.879$

| Surface No. | r | d | N | ν |
|---|---|---|---|---|
| 1 | ∞ | 0.30 | 1.51633 | 64.1 |
| 2 | 0.964 | 0.07 | | |
| 3 | ∞ | 0.30 | 1.84666 | 23.9 |
| 4 | ∞ | 0.80 | 1.72916 | 54.7 |
| 5 | −0.820 | 0.05 | | |
| 6 | 5.515 | 0.90 | 1.72916 | 54.7 |
| 7 | −0.998 | 0.30 | 1.84666 | 23.9 |
| 8 | −2.824 | | | |

EXAMPLE 3

$F_{NO} = 1:2.8$  $f = 0.796$  Distance to object = 10
$\omega = 60°$  $f_B = 0.377$

| Surface No. | r | d | N | ν |
|---|---|---|---|---|
| 1 | ∞ | 0.45 | 1.51633 | 64.1 |
| 2 | 0.630 | 0.07 | | |
| 3 | ∞ | 0.30 | 1.84666 | 23.9 |
| 4 | ∞ | 0.80 | 1.72916 | 54.7 |
| 5 | −0.806 | 0.05 | | |
| 6 | 1.800 | 1.35 | 1.77250 | 49.6 |
| 7 | −0.950 | 0.30 | 1.92286 | 21.3 |
| 8 | −4.194 | | | |

EXAMPLE 4

$F_{NO} = 1:2.5$  $f = 0.869$  Distance to object = 5
$\omega = 50°$  $f_B = 0.513$

| Surface No. | r | d | N | ν |
|---|---|---|---|---|
| 1 | ∞ | 0.45 | 1.51633 | 64.1 |
| 2 | 0.692 | 0.07 | | |
| 3 | ∞ | 0.30 | 1.84666 | 23.9 |
| 4 | 6.000 | 0.84 | 1.72916 | 54.7 |
| 5 | −0.824 | 0.05 | | |
| 6 | 1.814 | 1.30 | 1.72916 | 54.7 |
| 7 | −0.953 | 0.30 | 1.84666 | 23.9 |
| 8 | −21.633 | | | |

EXAMPLE 5

$F_{NO} = 1:2.8$  $f = 0.869$  Distance to object = 5
$\omega = 50°$  $f_B = 0.530$

| Surface No. | r | d | N | ν |
|---|---|---|---|---|
| 1 | ∞ | 0.45 | 1.51633 | 64.1 |
| 2 | 0.674 | 0.07 | | |
| 3 | ∞ | 0.30 | 1.84666 | 23.9 |
| 4 | ∞ | 0.02 | | |
| 5 | ∞ | 0.78 | 1.72916 | 54.7 |
| 6 | −0.821 | 0.05 | | |
| 7 | 1.849 | 1.28 | 1.72916 | 54.7 |
| 8 | −0.888 | 0.30 | 1.84666 | 23.9 |
| 9 | −11.066 | | | |

EXAMPLE 6

$F_{NO} = 1:2.8$  $f = 0.869$  Distance to object = 5
$\omega = 52°$  $f_B = 0.629$

| Surface No. | r | d | N | ν |
|---|---|---|---|---|
| 1 | ∞ | 0.45 | 1.51633 | 64.1 |
| 2 | 0.715 | 0.09 | | |
| 3 | −7.000 | 0.30 | 1.84666 | 23.9 |
| 4 | ∞ | 0.86 | 1.72916 | 54.7 |
| 5 | −0.853 | 0.05 | | |
| 6 | 1.875 | 1.29 | 1.72916 | 54.7 |
| 7 | −0.970 | 0.30 | 1.84666 | 23.9 |
| 8 | −6.141 | | | |

EXAMPLE 7

$F_{NO} = 1:2.8$  $f = 0.869$  Distance to object = 5
$\omega = 50°$  $f_B = 0.584$

| Surface No. | r | d | N | ν |
|---|---|---|---|---|
| 1 | ∞ | 0.45 | 1.51633 | 64.1 |
| 2 | 0.676 | 0.07 | | |
| 3 | ∞ | 0.30 | 1.84666 | 23.9 |
| 4 | ∞ | 0.84 | 1.74400 | 44.7 |
| 5 | −0.839 | 0.05 | | |
| 6 | 1.877 | 1.20 | 1.72916 | 54.7 |
| 7 | −0.950 | 0.30 | 1.84666 | 23.9 |
| 8 | −10.521 | | | |

EXAMPLE 8

$F_{NO} = 1:2.5$  $f = 1.052$  Distance to object = 13
$\omega = 50°$  $f_B = 1.009$

| Surface No. | r | d | N | ν |
|---|---|---|---|---|
| 1 | ∞ | 0.30 | 1.51633 | 64.1 |
| 2 | 1.173 | 0.11 | | |
| 3 | ∞ | 0.30 | 1.84666 | 23.9 |
| 4 | ∞ | 0.63 | 1.72916 | 54.7 |
| 5 | −0.900 | 0.05 | | |
| 6 | 8.749 | 0.30 | 1.84666 | 23.9 |
| 7 | 1.520 | 0.70 | 1.72916 | 54.7 |
| 8 | −2.000 | | | |

EXAMPLE 9

$F_{NO} = 1:2.5$  $f = 0.969$  Distance to object = 13
$\omega = 40°$  $f_B = 1.152$

| Surface No. | r | d | N | ν |
|---|---|---|---|---|
| 1 | ∞ | 0.30 | 1.51633 | 64.1 |
| 2 | 0.610 | 0.07 | | |
| 3 | ∞ | 0.30 | 1.84666 | 23.9 |
| 4 | ∞ | 0.73 | 1.72916 | 54.7 |
| 5 | −0.806 | 0.05 | | |
| 6 | 6.515 | 0.30 | 1.84666 | 23.9 |
| 7 | 1.495 | 0.77 | 1.72916 | 54.7 |
| 8 | −2.116 | | | |

EXAMPLE 10

$F_{NO} = 1:2.5$  $f = 0.909$  Distance to object = 13
$\omega = 43°$  $f_B = 0.979$

| Surface No. | r | d | N | ν |
|---|---|---|---|---|
| 1 | ∞ | 0.30 | 1.51633 | 64.1 |
| 2 | 0.610 | 0.07 | | |
| 3 | ∞ | 0.30 | 1.84666 | 23.9 |
| 4 | ∞ | 0.73 | 1.72916 | 54.7 |

-continued

| | | | | |
|---|---|---|---|---|
| 5 | −0.806 | 0.05 | | |
| 6 | 3.752 | 0.30 | 1.84666 | 23.9 |
| 7 | 1.173 | 0.84 | 1.72916 | 54.7 |
| 8 | −2.200 | | | |

EXAMPLE 11

| $F_{NO}$ = 1:2.8 | f = 1.006 | Distance to object = 10 | | |
|---|---|---|---|---|
| ω = 60° | $f_B$ = 0.976 | | | |
| Surface No. | r | d | N | v |
| 1 | ∞ | 0.30 | 1.51633 | 64.1 |
| 2 | 0.900 | 0.08 | | |
| 3 | ∞ | 0.30 | 1.84666 | 23.9 |
| 4 | ∞ | 0.80 | 1.72916 | 54.7 |
| 5 | −0.860 | 0.05 | | |
| 6 | 4.194 | 0.30 | 1.84666 | 23.9 |
| 7 | 1.184 | 0.80 | 1.72916 | 54.7 |
| 8 | −2.866 | | | |

EXAMPLE 12

| $F_{NO}$ = 1:2.8 | f = 1.006 | Distance to object = 10 | | |
|---|---|---|---|---|
| ω = 60° | $f_B$ = 0.972 | | | |
| Surface No. | r | d | N | v |
| 1 | ∞ | 0.30 | 1.51633 | 64.1 |
| 2 | 0.900 | 0.08 | | |
| 3 | ∞ | 0.30 | 1.84666 | 23.9 |
| 4 | ∞ | 0.80 | 1.76200 | 40.1 |
| 5 | −0.896 | 0.05 | | |
| 6 | 4.194 | 0.30 | 1.84666 | 23.9 |
| 7 | 1.184 | 0.80 | 1.72916 | 54.7 |
| 8 | −2.844 | | | |

What is claimed is:

1. An endoscope objective lens system comprising, in order from an object side:
    a divergent lens having a concave surface on an image side;
    a diaphragm stop; and
    immediately after the diaphragm stop, a convergent lens having the form of a convergent lens unit comprising, in order from the object side, a first optical element and a second optical element, said first and second optical elements being made of optical materials having different Abbe numbers (ν values) in such a way that the relation $ν_2 < ν_3$ is satisfied, where $ν_2$ is the Abbe number of the first optical element and $ν_3$ is the Abbe number of the second optical element, wherein said first and second optical elements are in close contact with each other or are bonded together;
    wherein said first optical element is parallel-plane glass and said second optical element is a planoconvex lens having a convex surface directed toward the image side.

2. An endoscope objects lens system comprising, in order from an object side:
    a divergent lens having a concave surface on an image side;
    a diaphragm stop; and
    immediately after the diaphragm stop, a convergent lens having the form of a convergent lens unit comprising, in order from the object side, a first optical element and a second optical element, said first and second optical elements being made of optical materials having different Abbe numbers (ν values) in such a way that the relation $ν_2 < ν_3$ is satisfied, where $ν_2$ is the Abbe number of the first optical element and $ν_3$ is the Abbe number of the second optical element, wherein said first and second optical elements are in close contact with each other or are bonded together;
    wherein said first optical element is a planoconcave lens having a small-curvature concave surface on the image side and said second optical element is a positive lens having a large-curvature surface directed toward the image side.

3. An endoscope objective lens system comprising, in order from an object side:
    a divergent lens having a concave surface on an image side;
    a diaphragm stop; and
    immediately after the diaphragm stop, in a convergent lens having the form of a convergent lens unit comprising, in order from the object side, a first optical element and a second optical element, said first and second optical elements being made of optical materials having different Abbe numbers (ν values) in such a way that the relation $ν_2 < ν_3$ is satisfied, where $ν_2$ is the Abbe number of the first optical element and $ν_3$ is the Abbe number of the second optical element, wherein said first and second optical elements are in close contact with each other or are bonded together;
    wherein said first optical element is a planoconcave lens having a small-curvature concave surface on the object side and said second optical element is a planoconvex lens having a convex surface directed toward the image side.

4. An endoscope objective lens system according to any one of claims 1 to 3 wherein at least one cemented positive lens is disposed on the image side of said convergent lens unit, said cemented positive lens comprising the combination of a positive lens element which is cemented to a negative lens element at a convex interface directed toward the image side and satisfying the relation $ν_p > ν_n$ where $ν_p$ is the Abbe number of the positive lens element and $ν_n$ is the Abbe number of the negative lens element.

5. An endoscope objective lens system according to any one of claims 1 to 3 wherein at least one cemented positive lens is disposed on the image side of said convergent lens unit, said cemented positive lens comprising a negative lens element which is cemented to a positive lens element of a concave interface directed toward the image side and satisfying the relation $ν_n < ν_p$ where $ν_n$ is the Abbe number of the negative lens element and $ν_p$ is the Abbe number of the positive lens element.

6. An endoscope objective lens system comprising, in order from an object side:
    a divergent lens having a concave surface on an image side;
    immediately after the divergent lens, a diaphragm stop; and
    immediately after the diaphragm stop, a convergent lens having the form of a convergent lens unit comprising, in order from the object side, a first optical element and a second optical element, said first and second optical elements being made of optical materials having different Abbe numbers (ν values) in such a way that the relation $ν_2 < ν_3$ is satisfied, where $ν_2$ is the Abbe number of the first optical element and $\nu_3$ is the Abbe number of the second optical element, wherein said first and second optical elements are in close contact with each other or are bonded together.

7. An endoscope objective lens system comprising, in order from an object side:
   a divergent lens having a concave surface on an image side;
   immediately after the divergent lens, a diaphragm stop; and
   immediately after the diaphragm stop, a convergent lens having the form of a convergent lens unit comprising, in order from the object side, a first optical element and a second optical element, said first and second optical elements being made of optical materials having different Abbe numbers ($\nu$ values) in such a way that the relation $\nu_2 - \nu_3 \leq -15$ is satisfied, where $\nu_2$ is the Abbe number of the first optical element and $\nu_2$ is the Abbe number of the second optical element.

8. An endoscope objective lens system according to claim 7, wherein said first and second optical elements are in close contact with each other or are bonded together.

9. An endoscope objective lens system comprising, in order from an object side:
   a divergent lens having a concave surface on an image side;
   a diaphragm stop; and
   immediately after the diaphragm stop, a convergent lens having the form of a convergent lens unit comprising, in order from the object side, a first optical element and a second optical element, wherein said first optical element is defined by substantially parallel-planes.

10. An endoscope objective lens system according to claim 9, wherein said second optical element is a plano-convex lens having a convex surface directed toward the image side.

11. An endoscope objective lens system comprising, in order from an object side:
    a divergent lens having a concave surface on an image side;
    a diaphragm stop; and
    immediately after the diaphragm stop, a convergent lens having the form of a convergent lens unit comprising, in order from the object side, a first optical element and a second optical element, said first and second optical elements being made of optical materials having different Abbe numbers ($\nu$ values) in such a way that the relation $\nu_2 < \nu_3$ is satisfied, where $\nu_2$ is the Abbe number of the first optical element and $\nu_3$ is the Abbe number of the second optical element, wherein said first and second optical elements are in close contact with each other or are bonded together;
    wherein at least one cemented positive lens is disposed on the image side of said convergent lens unit, said cemented positive lens comprising the combination of a positive lens element which is cemented to a negative lens element at a convex interface directed toward the image side and satisfying the relation $\nu_p > \nu_n$ where $\nu_p$ is the Abbe number of the positive lens element and $\nu_n$ is the Abbe number of the negative lens element.

12. An endoscope objective lens system comprising, in order from an object side:
    a divergent lens having a concave surface on an image side;
    a diaphragm stop; and
    immediately after the diaphragm stop, a convergent lens having the form of a convergent lens unit comprising, in order from the object side, a first optical element and a second optical element, said first and second optical elements being made of optical materials having different Abbe numbers ($\nu$ values) in such a way that the relation $\nu_2 < \nu_3$ is satisfied, where $\nu_2$ is the Abbe number of the first optical element and $\nu_3$ is the Abbe number of the second optical element, wherein said first and second optical elements are in close contact with each other or are bonded together;
    wherein at least one cemented positive lens is disposed on the image side of said convergent lens unit, said cemented positive lens comprising a negative lens element which is cemented to a positive lens element at a concave interface directed toward the image side and satisfying the relation $\nu_n < \nu_p$ where $\nu_n$ is the Abbe number of the negative lens element and $\nu_p$ is the Abbe number of the positive lens element.

* * * * *